No. 791,684. Patented June 6, 1905.

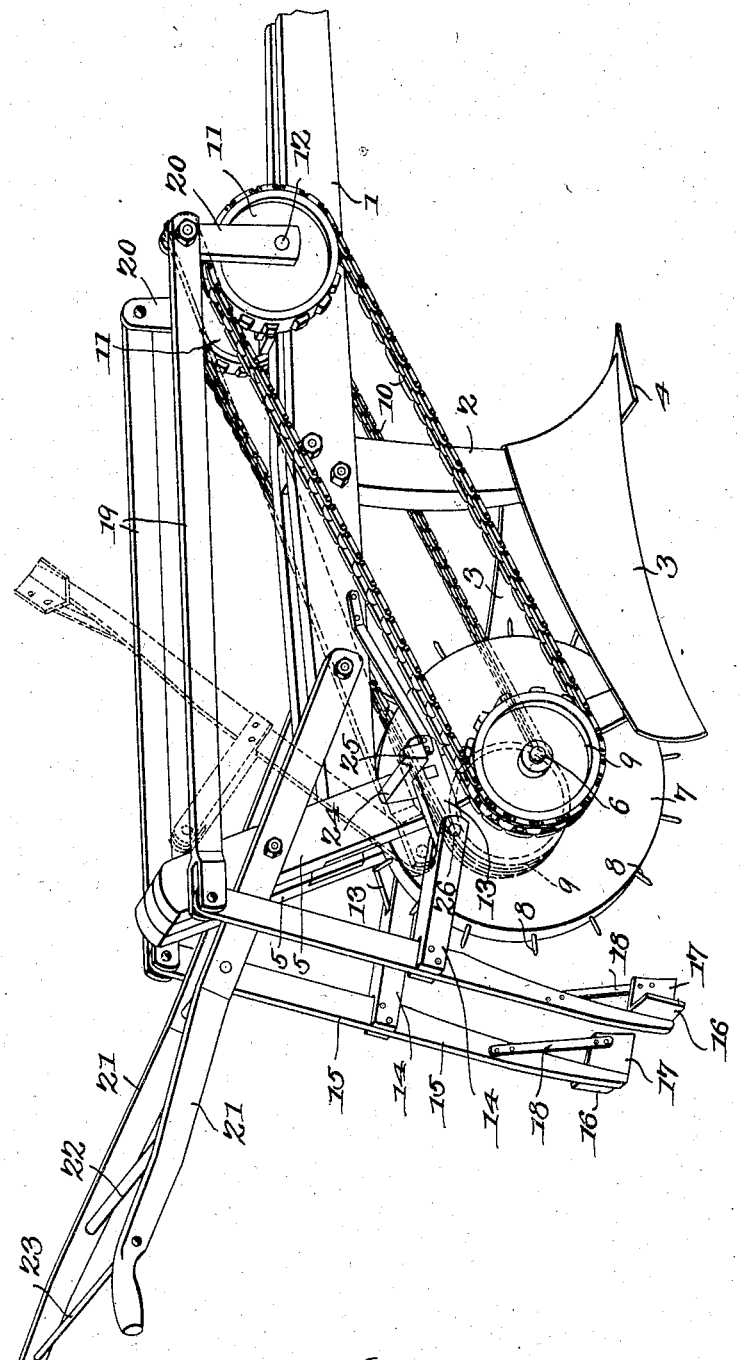

UNITED STATES PATENT OFFICE.

WILLIAM PRESCOTT FOSTER, OF FRANKLIN, LOUISIANA.

DITCHING-PLOW.

SPECIFICATION forming part of Letters Patent No. 791,684, dated June 6, 1905.

Application filed March 23, 1905. Serial No. 251,656.

*To all whom it may concern:*

Be it known that I, WILLIAM PRESCOTT FOSTER, a citizen of the United States, residing at Franklin, in the parish of St. Mary and State of Louisiana, have invented a new and useful Ditching-Plow, of which the following is a specification.

This invention relates to that class of double-moldboard plows which are used especially for ditching purposes, particularly in making ditches for drains.

The present invention has special reference to an attachment to be used in making intersecting or cross ditches, the object of said attachment being to effect the removal of dirt at the intersections or eyes of the ditches.

A further object of the invention is to promote simplicity, durability, and efficiency in the construction of the device.

With these and other ends in view, which will readily appear as the nature of the invention is better understood, the same consists in the improved construction and novel arrangement and combination of parts, which will be hereinafter fully described, and particularly pointed out in the claims.

In the accompanying drawing has been illustrated a simple and preferred form of embodiment of the invention, it being, however, understood that no limitation is necessarily made to the precise structural details therein exhibited, but that changes, alterations, and modifications may be made when such changes may be resorted to within the scope of the invention and without departing from the spirit or sacrificing the efficiency of the same.

The single view in said drawing is a perspective view of a ditching-plow constructed in accordance with the principles of the invention, the eye-openers being shown in dotted lines in inoperative position and in full lines in position for operation.

The device in the form illustrated includes a beam 1, having connected therewith a standard 2, carrying a double moldboard comprising the wings 3 3, all of which may be of the usual or any desired construction. Under the point of the plow is secured a subsoiling-plate 4, which insures the formation of a flat bottom to the ditch.

The rear end of the beam carries a frame consisting of a pair of side members 5 5, which are spaced apart and which afford bearings for a shaft 6, engaging an earth-engaging wheel 7, which operates between the side members of the frame. Said wheel may be provided upon its rim or periphery with radially-extending earth-engaging points, as 8, or the said wheel may be otherwise constructed or equipped to engage the ground, so as to cause it to be steadily and uninterruptedly rotated by contact therewith. The shaft 6 carries adjacent to the outer sides of the frame members 5 5 a pair of power-transmission wheels, such as sprocket-wheels 9, which are connected, by means of chains 10, with similar wheels 11, mounted upon a shaft 12, for which bearings are provided upon the beam 1. Each of the side members 5 of the frame is provided with a rearward-extending bracket 13, with which is pivotally connected a link 14, carrying at its outer end a standard or shank 15, which is firmly connected with said link. The lower ends of the standards 15 carry the shovels, or, as I prefer to call them, the "eye-openers" 16, each of which may be described as consisting of a blade provided at its inner edge and at approximately right angles thereto with a flange 17, which may be connected with the shank 15 by means of a brace 18. The upper ends of the standards 15 are connected, by means of pitmen 19, with cranks 20 upon the ends of the shaft 12.

Handles 21, whereby the machine may be guided, are secured to the sides of the beam 1, and said handles may likewise be bolted or otherwise suitably secured to or connected with the frame members 5. Said handles are spaced apart in the usual manner, as by means of rungs 22, and are connected by a drawbolt 23.

Each of the side members of the frame is provided above the bracket 13 with a laterally-extending bracket 24, having at its outer end a retaining-lug 25. When the pivots 26, which serve to connect the links 14 with the brackets 13, are detached, the pitmen 19 may be dropped onto the supporting-brackets 24, and the shanks carrying the eye-openers may then be folded forwardly upon said pitmen, as clearly shown in dotted lines in the drawing. The plow may then be used as an ordinary ditching-plow or for any purpose or purposes to which a double-moldboard plow is ordinarily applied.

When the machine is in operation, motion is transmitted from the axle to the shaft 12 by means of the chains 10, and said shaft being rotated will operate the pitmen 19, with the effect of imparting to the standards 15, carrying the eye-openers, a reciprocatory or up-and-down movement in the direction of their lengths, said shanks moving tangentially to the arc of a circle having for its center the pivotal connecting points of the arms or links 14 with the brackets 13.

As previously stated, the plow may be used in the construction of ordinary parallel ditches, which are usually made at certain predetermined distances—say six feet apart. When these primary ditches are to be intersected by other ditches, the improved attachment which constitutes the gist of the invention comes into operation. It is to be understood that the sizes of the earth-engaging wheel 7 and the power-transmission wheels 9 and 11 are to be so proportioned that the shovels or eye-openers will be brought into earth-engaging position just one time while the space separating the primary ditches is traversed, and by starting at the proper point it is obviously an easy matter to cause the eye-openers to engage the ground at the intersection of the ditches. Now it is well known that when intersecting ditches are formed more or less of the soil will be crowded into the primary ditches at the points of intersection known as the "eyes." The dirt thus crowded into the primary ditches will be engaged by the shovels 16, the flanges 17 meanwhile preventing any portion of the dirt from dropping back into the secondary ditch, and as the machine progresses the said dirt will be carried or scraped by the shovel part of the eye-opener out of the ditch and be deposited upon the top or ridge. The operation of clearing or opening the eyes of intersecting ditches has heretofore been performed by manual labor and at considerable expense. By this invention the desired result is accomplished automatically by the plow or machine forming the intersecting ditches.

It will be readily understood that in the construction of this device any suitable material or combination of materials may be employed. It will also be understood that the eye-opening attachment which forms the gist of the invention may be applied to ditching-machines of a construction different from that herein shown without departing from the invention.

Having thus described the invention, what is claimed is—

1. A ditching-plow having supported shanks, and eye-openers connected with said shanks movable in the direction of their lengths and timed to engage the ground at regular intervals.

2. A ditching-plow having brackets, links pivotally connected with said brackets, shanks supported by the links, and means for vibrating said links and shanks; and shovels connected with the lower ends of the shanks and having flanges at their inner edges.

3. The combination with a ditching-plow, of links supported for vibration, shanks carried by said links, eye-opening shovels carried by said shanks, and operating means.

4. A cross-drain ditching-machine having movably-supported shanks provided with eye-opening shovels timed to engage the ground at regular intervals, said shovels being provided with flanges at their inner edges.

5. A ditching-plow, links connected pivotally and detachably with the same, shanks supported by said links, eye-opening shovels at the lower ends of said shanks, a suitably-supported driven shaft having cranks at the ends thereof, pitmen connecting said cranks with the upper ends of the shanks, and brackets extending laterally from the frame and adapted to support the pitmen and shanks.

6. A ditching-plow having spaced frame members, a ground-engaging wheel supported for rotation between said frame members, links connected pivotally with brackets extending rearwardly from said frame members, shanks connected with said links and having eye-opening shovels at their lower ends, a shaft supported upon the plow-beam and having sprocket-wheels at the ends thereof, sprocket-wheels upon the shaft of the ground-engaging wheel, chains connecting the latter sprocket-wheels with those upon the shaft supported upon the beam, cranks upon the latter shaft, and pitmen connecting said cranks with the shanks carrying the eye-openers.

7. The combination with a ditching-plow, of links pivotally connected with the plow-frame, shanks securely connected with the free ends of said links, eye-opening shovels at the lower ends of said shanks provided with flanges at their inner edges, braces connecting said flanges with the shanks, and means connected with said shanks for imparting a vibratory movement to said shanks and the links supporting the same.

In testimony that I claim the foregoing as my own I have hereto affixed my signature in the presence of two witnesses.

WILLIAM PRESCOTT FOSTER.

Witnesses:
R. EMMET O'ROUKE,
J. CURTIS WALDO.